Nov. 14, 1950   F. E. McCANN   2,529,954
BARN CLEANER AND LOADING MACHINE
Filed March 11, 1946   4 Sheets-Sheet 1

Inventor
FLOYD E. McCANN

By Clarence A. O'Brien
and Harvey B. Jacobson
Attorneys

FLOYD E. McCANN

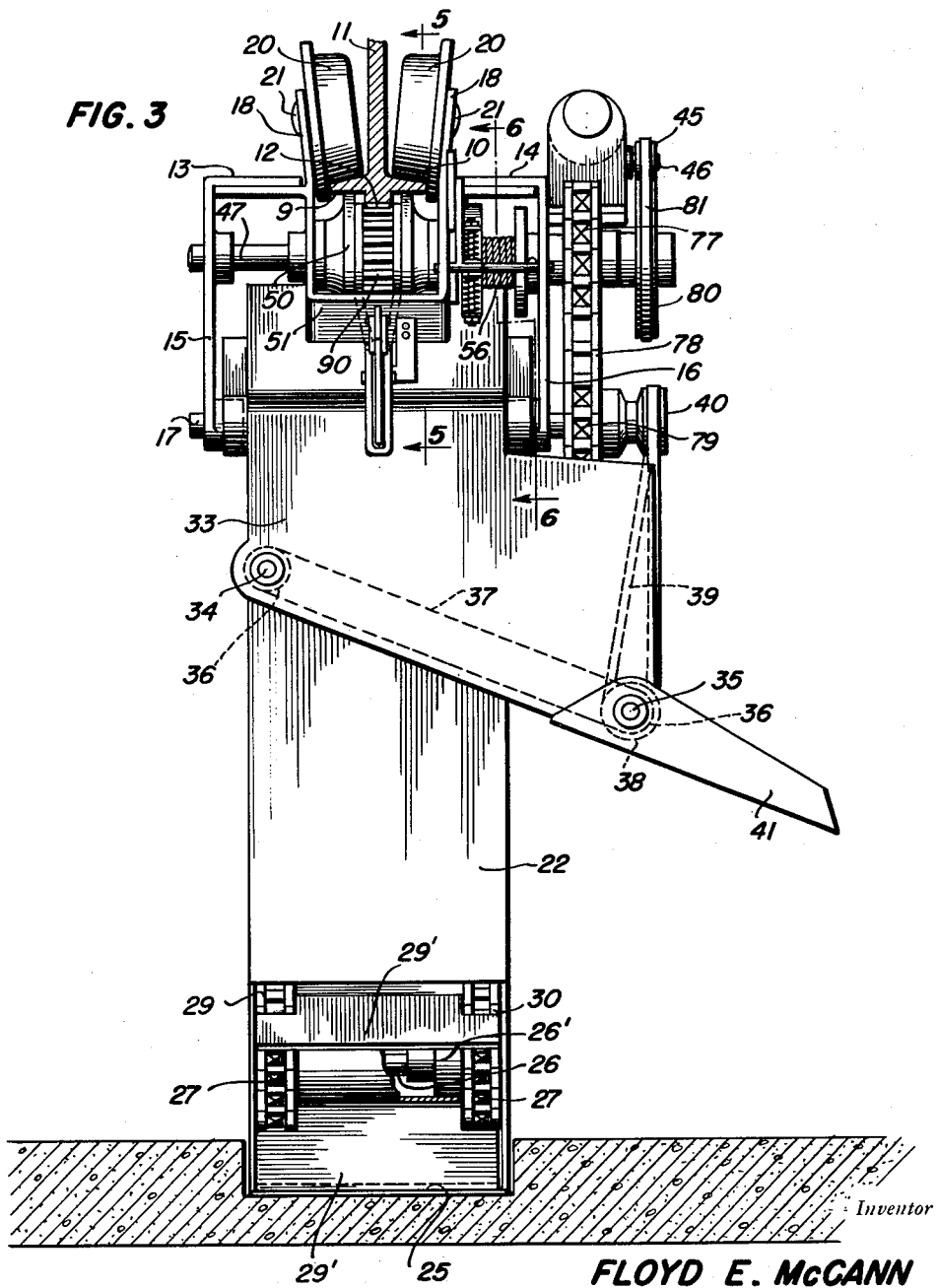

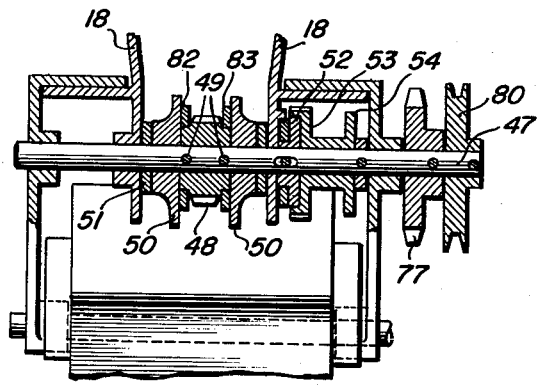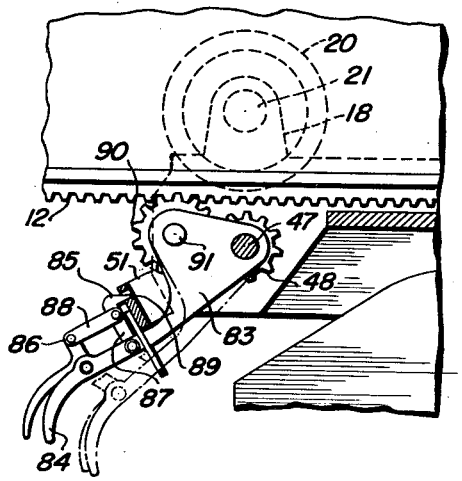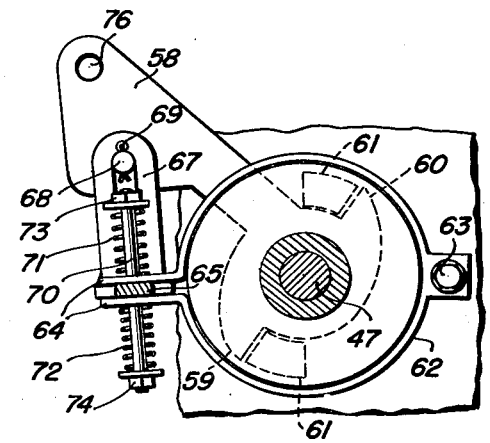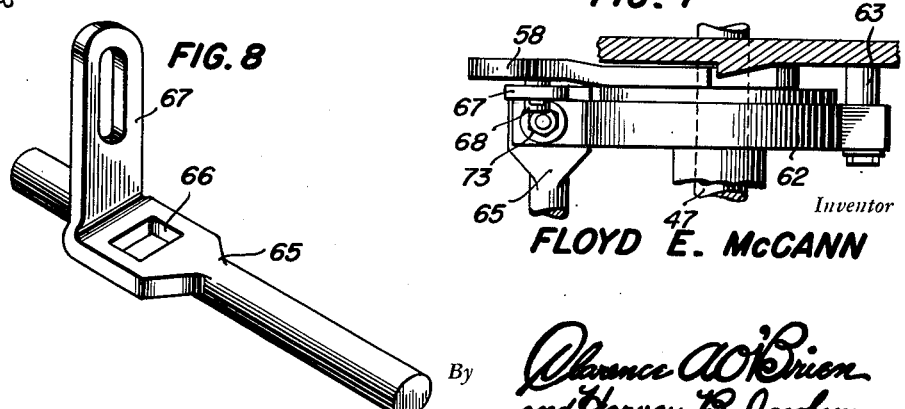
Inventor
FLOYD E. McCANN

Patented Nov. 14, 1950

2,529,954

UNITED STATES PATENT OFFICE 2,529,954

BARN CLEANER AND LOADING MACHINE

Floyd E. McCann, Milwaukee, Wis., assignor of one-half to Erwin C. Noeldner, Loyal, Wis.

Application March 11, 1946, Serial No. 653,528

4 Claims. (Cl. 198—93)

This invention relates to improvements in barn cleaners and loading machines for removing manure from barns and loading the same into a suitable vehicle or truck, as for example a tractor drawn manure spreader.

An object of the invention is to provide an improved apparatus which will be supported for movement upon an elevated trackway in a barn or stable, whereby manure from the stalls may be collected in a trough formed in the stable floor, and a suitable elevator operable in conjunction with said apparatus will collect and lift the manure from said trough to deposit the same on a lateral conveyor, where it will be discharged into a manure spreader.

Another object of the invention is to provide a motor driven self-propelled manure collecting and loading apparatus for barns or stables, which will be supported upon an elevated toothed trackway for longitudinal movement within the barn or stable, and which will include a combined brake and clutch mechanism for controlling the operation of said apparatus.

A still further object of the invention is to provide an improved manure cleaning and loading apparatus for barns and stables, which will include an elevated track supported mechanism having a driving motor with gear reduction for operating a loading elevator and conveyor, and also for moving the apparatus along said elevated track.

Another object of the invention is to provide an improved manure cleaning and loading apparatus for barns and stables, which will be highly efficient in operation, and relatively inexpensive to manufacture and produce.

Other objects will appear as the description proceeds.

In the accompanying drawings which form a part of this application,

Figure 3 is an end view of the improved manure cleaning and loading apparatus;

Figure 4 is a sectional view taken on the line 4—4 of Figure 2;

Figure 5 is a sectional view taken on the line 5—5 of Figure 3;

Figure 6 is a sectional view taken on the line 6—6 of Figure 3;

Figure 7 is a plan view, partly in section of the combined brake and clutch mechanism shown in Figure 6, and Figure 8 is a perspective view of the slotted brake and clutch operating shaft.

Like characters of reference are used throughout the following specification and the accompanying drawings to designate corresponding parts.

Figure 1:
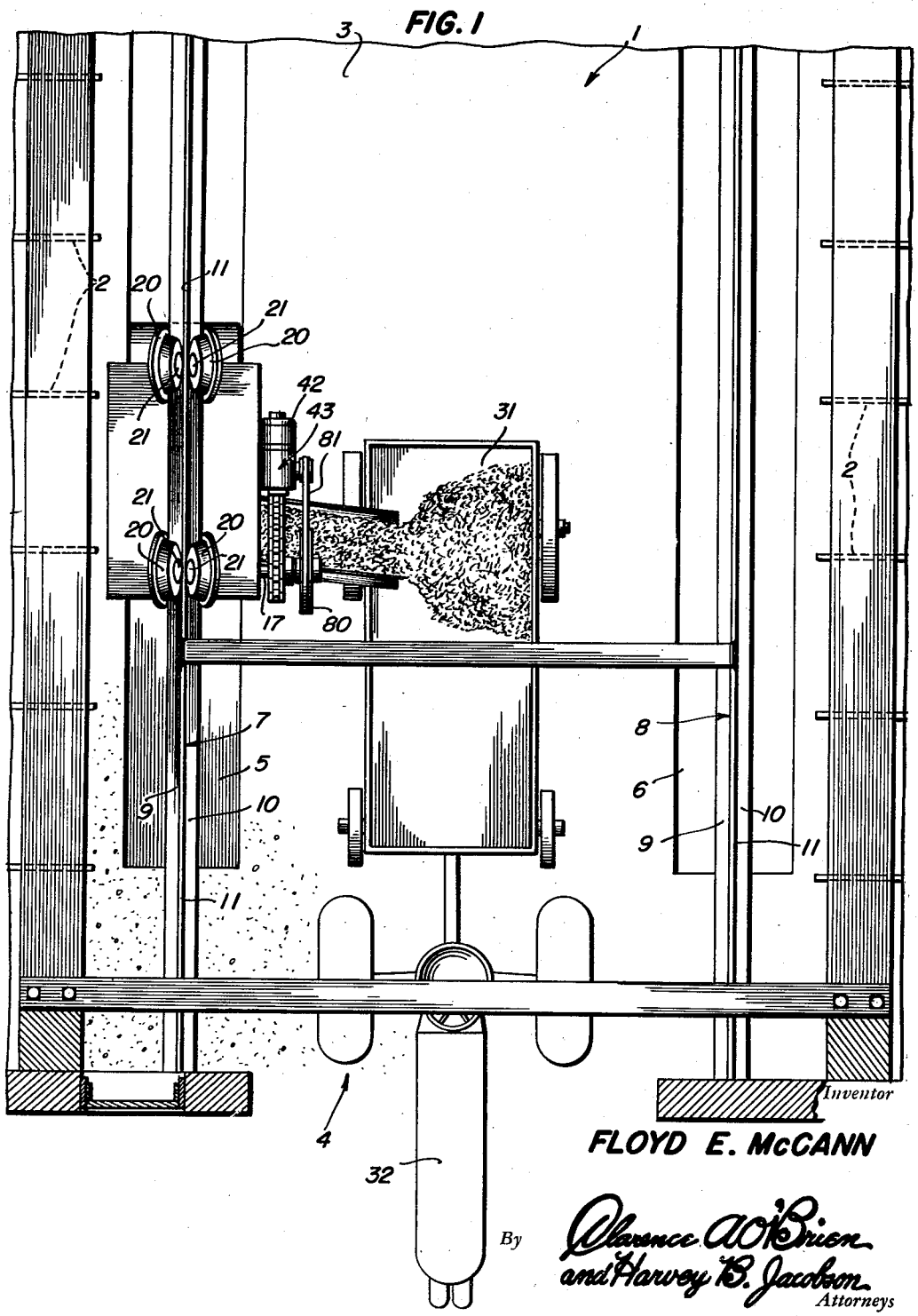
Figure 1 is a plan view, partly in section of a barn with the improved manure cleaning and loading apparatus positioned therein.

In carrying out the invention, there is provided a barn or stable 1 having stalls 2 arranged along its opposite sides, and a central or longitudinally extending runway 3. A door opening 4 is provided for the barn or stable 1, and longitudinally clean-out troughs 5 and 6 are provided at the opposite sides of the runway 3 adjacent the stalls 2.

Overhead tracks 7 and 8 are supported directly over the troughs 5 and 6, and are formed with the oppositely extending rails 9 and 10, and the central web portions 11 which are shaped at their lower ends into the toothed racks 12.

The trolley housing includes the oppositely disposed plates 13 and 14, which are formed with integral depending side plates 15 and 16 having suitable bearings, which support the cross-shaft 17 for the manure elevating or loading conveyor later to be described.

Upwardly and outwardly extending bearing ears 18 and 19 support stub shafts or axles 21 carrying trolley wheels 20 which are adapted to roll on the laterally extending side rails 9 and 10 of the overhead track.

The manure loading conveyor includes the cross-shaft 17 before mentioned which extends between the lower ends of the side plates 15 and 16, and an extensible conveyor casing or housing comprising a head or upper portion 20′ and downwardly extending top and bottom portions 21′ and 22, respectively, said top and bottom portions being secured to said head portions by means of the bolts 23, and said top and bottom portions 21 and 22 being adjustably secured together and to the conveyor frame 95 by means of the bolts 24. A shoe 25 is formed on the lower end of the conveyor casing and is adapted to be operable within the troughs 5 and 6 as the conveyor and loading mechanism is operated along the overhead tracks. A shaft 26 is mounted in the bearings 26′ between the sides of the conveyor casing adjacent its lower end, and supports the sprocket 27 at opposite ends. Sprockets (not shown) are secured to the opposite ends of the shaft 17, and chains 29 and 30 are connected between the sprocket 27 and the first mentioned sprocket on the shaft 17, and carried spaced blades or plates 29' secured at spaced intervals to said chains, to engage and carry the manure up the conveyor, where it is discharged on a laterally extending endless belt conveyor 37, to be discharged into a manure spreader 31 pulled by the tractor 32, and located in the runway 3.

The casing 33 for the endless belt conveyor 37 is supported by the head portion 20' of the loading conveyor. Shafts 34 and 35 are arranged across the casing 33 at its opposite ends, and support the rollers 36 upon which the endless belt 37 is mounted. A pulley 38 is secured to the end of the lower shaft 35 and is connected by means of the belt 39 to a pulley 40 mounted on the end of the shaft 17, and is driven thereby. A pivoted discharge chute 41 is secured to the shaft 35, and extends below the end of the conveyor casing 33.

An electric motor 42 and reduction gearing 43 is mounted upon a plate 44 attached to the plate 16. A pulley 45 is secured to the motor shaft 46, and said motor may be controlled from below, if desired.

A driving or operating shaft 47 is mounted between the depending side plates 15 and 16, and between the U-shaped frame 51 formed integrally with the trolley housing and extending forwardly thereof at a slight angle, and below the same. A driving gear 48 is secured by the pins 49 to the shaft 47, and bearing rollers 50 are mounted at either side of said gear 48 to contact the under surfaces of the side rails 9 and 10, said gear and rollers being located between the sides of the U-frame 51.

A combined clutch and brake mechanism is supported upon the shaft 47, and includes a clutch plate 52 on the said shaft 47, and the cooperating clutch housing 53, said housing forming an end of the cable holding spool or drum 54, also mounted upon the shaft 47. An ear 55 is formed on the upper casing portion 21' of the loading conveyor and has a cable 56 attached thereto. The cable 56 extends over a pulley 57 on the trolley housing and forwardly thereof to be wound on said cable drum or spool 54.

A clutch and brake operating arm 58 is supported by the shaft 47 and is formed with the oppositely disposed shoulders 59 and 60 adapted to engage the stop 61 on the clutch mechanism. A brake shoe 62 is supported upon the pin 63, and is formed with the parallel extending arms 64 between which the brake release member 65 is positioned. The brake release member 65 is mounted for rotation between the U-frame 51 and the depending side plate 16, and is apertured at 66, and formed with the slotted upwardly extending arm 67. A laterally extending pin 68 mounted on the arm 58 will be extended through the slot in the arm 67 and held therein by the cotter pin 69. A rod 70 threaded at its opposite ends will extend through the aperture 66 in the brake release arm 65 and through the parallel arm 64, and supports the tensioning coil springs 71 and 72, which are adjustably tensioned by means of the nuts 73 and 74 on the opposite ends of the said rod 70. An operating cable 75 may be secured in the aperture 76 in the outer end of the arm 58 for simultaneously releasing the brake and operating the clutch when the cable 56 is to be wound upon the drum or spool 54, to elevate the loading conveyor.

A sprocket 77 is secured to the shaft 47, and supports the drive chain 78 which also extends over the sprocket 79 on the end of the shaft 17 to operate the loading conveyor.

A pulley 80 is secured to the outer end of the shaft 47 and is connected by the drive belt 81 to the pulley 45 on the ends of the motor shaft 46 for providing the driving power for operating the several mechanisms.

The spaced side plates 82 and 83 are pivotally supported on the shaft 47 at either side of the driving gear 48, and extend downwardly to form a handle 84. A locking dog 85 is pivoted at 86 to the handle 84, and a bell crank lever 87 is also pivoted to the handle 84, and a connecting link 88 is secured between the dog 85 and the bell crank lever 87, whereby when the handle is grasped to operate the bell crank lever, the dog 85 will be disengaged from its keeper or slot 89 in the U-frame 51, and the driven gear 90 supported between the plates 82 and 83 on the shaft 91 will be disengaged from the toothed rack 12, to permit the trolley mechanism to be slid backwards and forwards upon the side rails 9 and 10.

It will be understood that the trolley mechanism supporting the loading conveyor and the endless conveyor may be positioned upon either one of the overhead tracks 7 or 8, to clean out the troughs 5 and 6, and that the mechanism may be slid backwardly and forwardly upon the said overhead rails, and that the loading conveyor may be elevated or depressed at the will of the operator.

Figure 2:
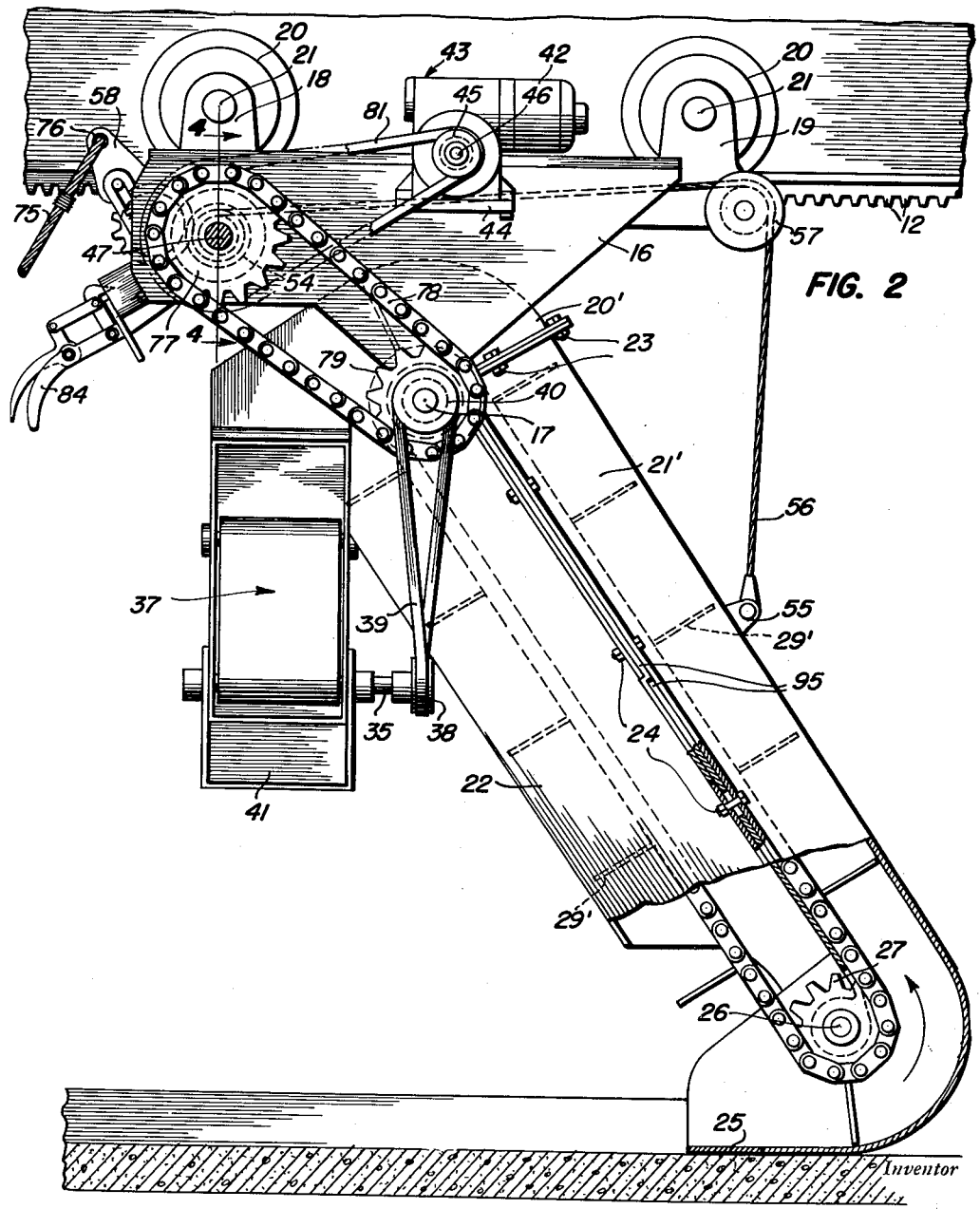
Figure 2 is a side elevation, partly broken away showing the improved manure cleaning and loading apparatus.

In operation and assuming that the conveyor unit and the lever 84 is in the position shown in Figure 2, the motor 42 drives the pulley 80 on shaft 47 and by means of sprockets 77 and 79 and chain 78 the shaft 17. Shaft 17 drives the longitudinally arranged inclined elevating conveyor by means of the sprockets 27 and of the chains 29, 30. Thereby the scooping plates 29' seize the manure or other material which has been collected by the shoe and convey it upwardly.

Shaft 17 also drives pulley 40 which in its turn by means of belt 39 drives pulley 38, shaft 35 and conveyor 37. The material collected by the scooping plates 29 therefore travels upwardly as the plates fit into the casing and is dumped on conveyor 37 and is moved transversely by said conveyor, reaches the chute 41 which is suitably adjusted for discharge, and is discharged into spreader wagon 31.

When shaft 47 is driven, as above described, toothed wheel 48 is moved, which meshes with cog wheel 90 which in its turn meshes with the rack 12. Therefore the conveyor unit during this operation is automatically moved along the rail with the shoe moving in the trough and collecting manure or other material during such movement.

Should the operator want to start cleaning at any place, he seizes handle 84, depresses lever 87 and moves the cog wheel out of gear. He can then move the unit to any place without being forced to run the conveyor slowly to this place.

When the operator wants to stop cleaning operation and to suspend the elevator so as to free the space from obstruction he pulls the cable 75 while the motor is running. Normally as will be clear the winding drum which is freely rotatable on the shaft 47 does not participate in the rotation and is held because the brake 62 is permanently applied by the springs 71, 72. However when the operator pulls cable 75, the lever 58 is rotated and by virtue of the shoulders 60 running over the cam surfaces 61 upon such displacement, the coupling disk 52 is shifted and the winding drum is coupled with the shaft 47. Simultaneously the brake is released, as release lever 58 by means of pin 68 sliding in slotted arm 67 turns release member 65 forcing the arms 64 apart. The winding drum therefore starts to wind the cable 56 and the conveyor unit is thereby lifted and is now suspended at both ends.

The unit may then be removed altogether, if desired from one track and placed on another track, by using transverse shifting means (not shown) which may be provided in the barn.

While the preferred embodiment of the invention has been illustrated and described, it will be understood that it is not intended to limit the scope of the invention thereto, as many minor changes in detail of construction may be resorted thereto without departure from the spirit of the invention.

Having thus described my invention what I claim as new and desire to secure by Letters Patent of the U. S. is:

1. In a device for collecting manure and other waste material from a manure collecting trough in the ground, an overhead track arranged above and running along said trough, a trolley frame supported on said track for longitudinal movement along the same, a conveyor unit comprising a plurality of conveyors supported by said trolley frame, one of said conveyors being an elevating conveyor, provided with a collecting head adapted to enter into and to slide within said trough and with means for seizing the material entering said collecting head and for carrying it upwardly, a further transversely arranged conveyor located adjacent the first named conveyor near the upper end thereof, for substantially transversely directed transport, a chute for discharging the material at the end of the last named conveyor, means for driving each of said conveyors, engageable means on said trolley frame and on said track for moving said conveyor carrying trolley frame along said track, a control shaft, hand controlled means mounted on said shaft for engaging and disengaging the aforesaid engageable means on said trolley frame and said track and further means mounted on said shaft for raising and lowering said elevating conveyor, said means including a hoisting means and a hand operated clutch mechanism and brake mechanism for connecting said hoisting means with the driving means.

2. In a device for collecting manure and other waste material from a manure collecting trough in the ground, an overhead track arranged above and running along said trough, a trolley frame supported on said track for longitudinal movement along the same, a conveyor unit comprising a plurality of conveyors supported by said trolley frame, one of said conveyors being an elevating conveyor, provided with a collecting head adapted to enter into and to slide within said trough and with means for seizing the material entering said collecting head and for carrying it upwardly, a further transversely arranged conveyor located adjacent the first named conveyor near the upper end thereof, for substantially transversely directed transport, a chute for discharging the material at the end of the last named conveyor, means for driving each of said conveyors, disconnectable means for advancing the conveyor carrying trolley frame along the overhead tracks, said means including a rack on the overhead track, a cogwheel and a driving wheel, the latter in operative connection with the conveyor driving means, and a frame for the cogwheel pivotally suspended for rotation around the axis of the driving wheel, a hand lever for moving said cogwheel into and out of engagement with the said rack and means for raising and lowering said elevating conveyor.

3. In a device for collecting manure and other waste material from a manure collecting trough in the ground, an overhead track arranged above and running along said trough, a trolley frame supported on said track for longitudinal movement along the same, a transversely directed shaft on said conveyor frame, a conveyor unit suspended on said shaft for pivotal movement around the same, said unit consisting of an inclined conveyor, substantially extending and moving in parallelism to the longitudinal plane of the track and provided with a collecting head, adapted to move within said trough, a casing for the same, and a transversely extending conveyor arranged below the upper end of the inclined conveyor, a casing for the same, attached to the casing of the first named conveyor, a chute for the discharge of material from the transverse conveyor, means for driving said conveyors, connected with the transversely directed shaft on the trolley frame, a hoisting mechanism for the conveyor unit, including a cable attached to said unit and a freely rotatable cable winding drum on said transversely directed shaft, and a brake and clutch mechanism connected with said winding drum and provided with hand operated means for operating said clutch and brake mechanism.

4. A device of the character specified and claimed in claim 3, wherein the clutch and brake mechanism on the transversely directed shaft comprises, an axially fixed but rotatable coupling member, provided with a brake cylinder fixedly connected with the cable winding drum, a rotatable axially displaceable member, a spring operated brake band permanently applied against the braking cylinder, a brake release member and a hand operated release arm rotatable on said transversely directed shaft provided with shoulders for axially displacing the same simultaneously operating the release member and the axially displaceable member of the coupling.

FLOYD E. McCANN.

REFERENCES CITED

The following references are of record in the file of this patent:

UNITED STATES PATENTS

| Number | Name | Date |
| --- | --- | --- |
| 681,575 | Packer | Aug. 27, 1901 |
| 1,116,096 | Miller | Nov. 3, 1914 |
| 1,230,236 | Stuart | June 19, 1917 |
| 1,461,800 | Lewis | July 17, 1923 |
| 1,529,584 | Fox | Mar. 10, 1925 |
| 1,804,287 | Spry | May 5, 1931 |
| 2,147,027 | Grier | Feb. 14, 1939 |
| 2,173,177 | Menk | Sept. 19, 1939 |